Dec. 3, 1957 M. H. DUBOIS 2,815,398

INTERCOMMUNICATION SYSTEMS

Filed Dec. 14, 1954 2 Sheets-Sheet 1

INVENTOR
MARTIN H. DUBOIS

BY Strauch, Nolan & Neale
ATTORNEYS

Dec. 3, 1957 M. H. DUBOIS 2,815,398

INTERCOMMUNICATION SYSTEMS

Filed Dec. 14, 1954 2 Sheets-Sheet 2

INVENTOR
MARTIN H. DUBOIS

BY Stauch, Nolan & Neale
ATTORNEYS

United States Patent Office 2,815,398

Patented Dec. 3, 1957

2,815,398

INTERCOMMUNICATION SYSTEMS

Martin Helmer Dubois, Hagersten, Sweden, assignor to Svenska Relafabriken AB, Stockholm, Sweden, a Swedish joint-stock company Application December 14, 1954, Serial No. 475,082

Claims priority, application Sweden October 15, 1952

8 Claims. (Cl. 179—1)

This application is a continuation-in-part of my copending application, Serial Number 385,637, filed October 12, 1953.

The present invention relates to so called intercommunication systems having amplifiers and loudspeaking telephones.

Usually such systems are provided with a one-channel amplifier for each two-way talking connection and a shifting key by means of which the input and output of the amplifier is reversed in the circuit as the direction of the transmission is changed. Upon a call from one telephone set to another the called set is connected to the input of the amplifier and the calling set to the output of the amplifier, and each time the calling person wants to speak he operates his shifting key and keeps it operated as long as he speaks whereby the connection to the amplifier becomes reversed so that the amplifier is operative in a direction from the calling party. Such a shifting key is of course necessary in a system of this kind. However the need of such a manual shifting involves certain drawbacks e. g. as regards ease of operation, and therefore systems have been proposed having two-channel amplifiers, i. e. one amplifier for each direction of transmission. However in such systems there will be a tendency of acoustic feedback occurring which results in singing and oscillations, and therefore blocking and deblocking means have been provided operable by the microphone currents of one or both of the telephone sets and designed to keep only one amplifying channel or amplifier operative at a time. However in this case another drawback will arise which is sometimes of essential importance, namely the fact that in certain places as workshops and the like the noise level is so high that a shifting will not take place after talking has stopped, but the channel to the telephone set concerned becomes lastingly blocked.

The present invention relates to systems of the last-mentioned kind having alternately blocked amplifiers or amplifying channels and basically contemplates the provision of means by the aid of which the automatic blocking and deblocking means can be temporarily made inoperative if the existing noise level proves to be too high to enable the automatic shifting to be effective.

Figure 1:
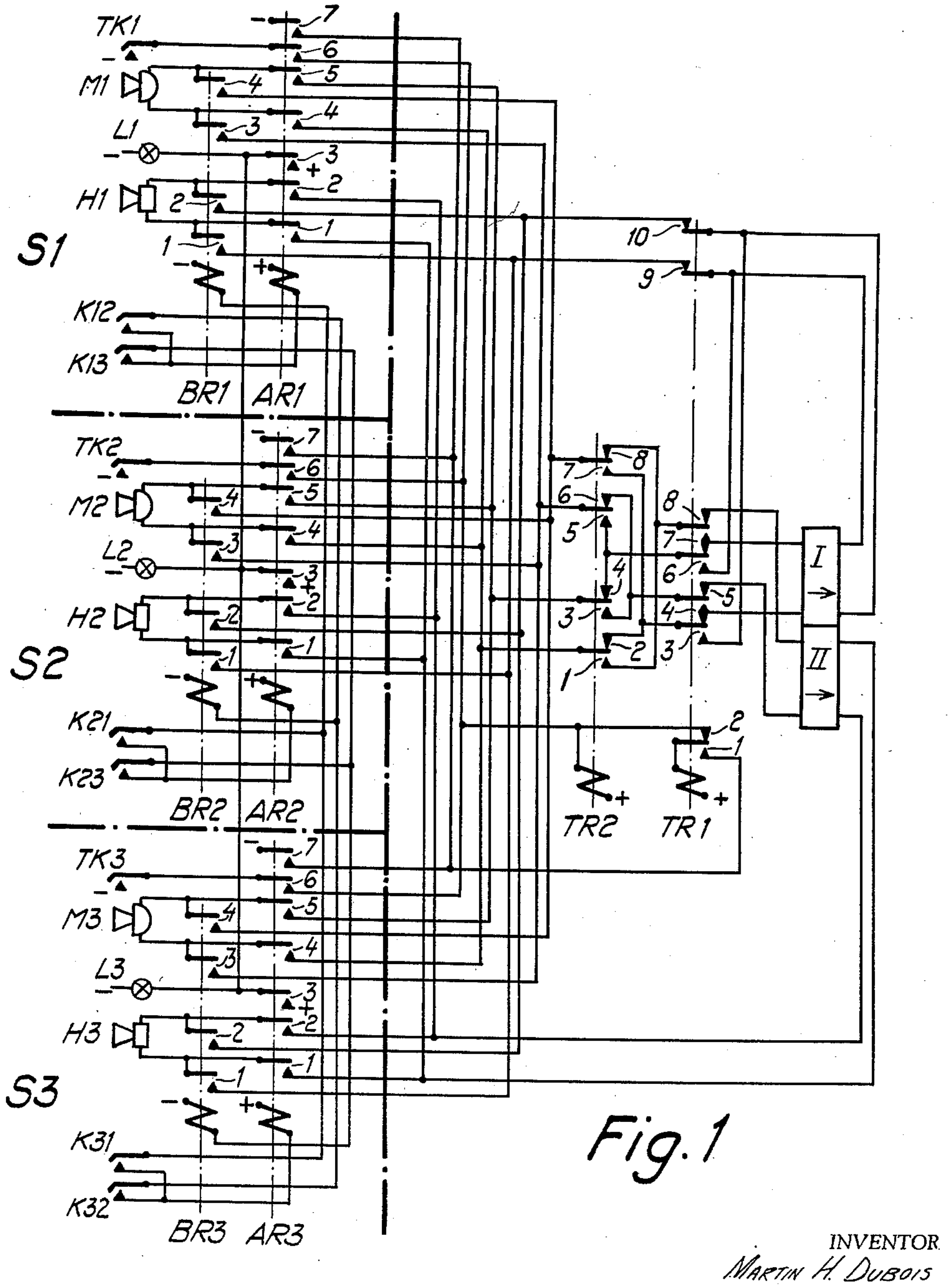
Figure 2:
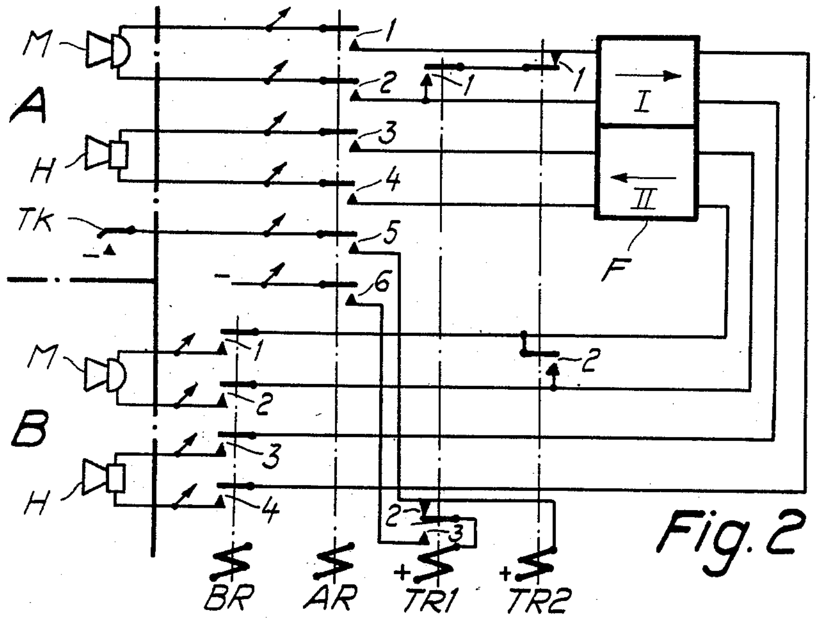
Figure 3:
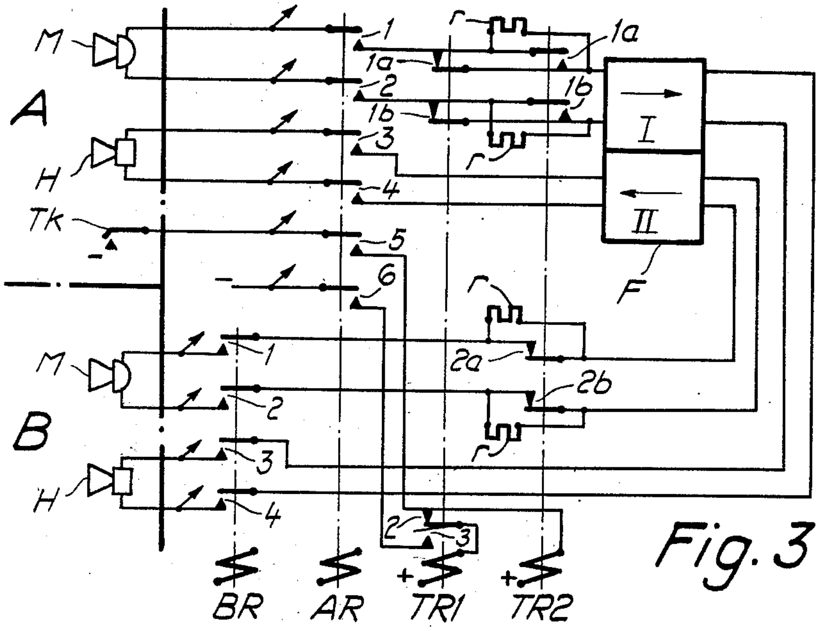

The invention will be described more in particular in connection with the accompanying drawings on which Figures 1, 2 and 3 show three different embodiments.

Figure 1 shows a circuit diagram of a complete communication system comprising three telephone sets or subscriber's stations S1, S2 and S3 and a connecting circuit (to the right of the vertical dash-dot line) including two amplifiers I and II. The telephone sets S1, S2 and S3 are all alike, and corresponding elements in the different sets have been designated by the same letter or letters accompanied by a numeral indicating the individual set to which the respective element belongs. When in the following description such elements are mentioned without reference to an individual set to which they belong, these numerals have been omitted. Each telephone set comprises two transducers M and H, two relays AR and BR, switching devices K for calling any of the other sets, a shifting key TK and a signalling lamp L. The transducers M are of the type capable of serving both as microphone and loudspeaker. Transducers H may be of the same type, but this is not necessary, since transducers H will only serve as loudspeakers. Relays AR and BR are each provided with a plurality of make contacts. In the figure the contacts belonging to each relay are shown in a vertical row above the coil of the respective relay. The switching devices K have also been designated by numbers the first numeral of which indicates the telephone set to which the switching device belongs, and the second of which indicates the telephone set to which a call is established when the switching device is operated. These switching devices are of the two-position type and remain in the position to which they are moved when operated until they are operated again. The shifting keys TK on the other hand are preferably of the resilient type, so that they will remain in closed condition only as long as they are actuated, e. g. manually, and will resume their normal (i. e. open) condition as soon as this actuation ceases.

The two amplifiers I and II which are preferably built into one unit, are of the type having means for automatically blocking one amplifier in response to speech currents through the other amplifier and vice versa. Amplifiers of this kind are well known, e. g. by U. S. Patent No. 2,353,711 granted July 4, 1944 to W. Hasenberg, and therefore no detailed description of them will be given here.

The system further comprises two switching devices TR1 and TR2 which are preferably in the form of relays and included in the connecting circuit as shown. These switching devices together with shifting keys TK represent an essential feature of the invention.

Of course the system is also provided with one or more sources for supplying the electric power necessary for operating the system. For the sake of clearness such power sources have not been shown in the figure, but plus or minus signs have been inserted to show where the various elements of the system are connected to positive or negative terminals of a D. C. power source.

The figure shows the system at rest, i. e. the various switches and contacts are shown in the positions which they have when no connection has been or is being established between any two telephone sets within the system.

The mode of operation of the system will now be described under the assumption that a person at station S1 wants to speak to a person at station S3.

The subscriber at S1 operates the switch K13. Then the following circuit is closed: positive terminal—coil of relay AR1—closed switch K13—coil of relay BR3 in station S3—negative terminal. Thus relay AR1 at station S1 and relay BR3 at station S3 are energized and the make contacts of these relays are closed, whereby stations S1 and S3 are connected to the connecting circuit including the amplifiers I and II. The transducer M1 (now serving as microphone) in station S1 is thus connected to transducer H3 (serving as loudspeaker) in station S3 over the following circuit: M1—contacts 4 and 5 of relay AR1—contacts 2 and 4 of relay TR2—contacts 4 and 7 of relay TR1—amplifier I—contacts 9 and 10 of relay TR1—contacts 1 and 2 of relay BR3—H3. At the same time transducer M3 (serving as microphone) in station S3 is connected to transducer H1 (serving as loudspeaker) in station S1 over the following circuit: M3—contacts 3 and 4 of relay BR3—contacts 6 and 8 of relay TR2—contacts 5 and 8 of relay TR1—amplifier II—contacts 1 and 2 of relay AR1—H1. Contact 6 of relay AR1 connects one contact member of shifting key TK1 to the coil of relay TR2 and to contact 2 of relay TR1. Contact 7 of relay AR1 connects the negative terminal of a D. C. source to contact 1 of relay TR1. Thus contacts 6 and 7 of relay AR1 when closed prepare an energizing circuit for relays TR1 and TR2 and a holding circuit for relay TR1 respectively. However these circuits are not completed until shifting key TK1 is operated as will be described below. Furthermore contact 3 of relay AR1 closes an energizing circuit for the signalling lamps L1, L2 and L3 in all the telephone sets included in the system. The lamps which may be called busy lamps, are thus lighted to indicate to all stations that a connection has been established.

The subscribers at stations S1 and S3 can now speak to each other over the two-channel communication path thus established between the two stations. Speech current emanating from transducer M1 is amplified in amplifier I and applied to transducer H3, while speech current emanating from transducer M3 is amplified in amplifier II and applied to transducer H1. When speech current is passing through amplifier I, it produces a control voltage which is applied to amplifier II so as to block the latter amplifier or to reduce its gain appreciably. In the same way amplifier I is blocked or its gain reduced when speech current is passing through amplifier II. In this manner acoustic feedback is eliminated.

The operation so far described is substantially the same as that of the above mentioned known systems having one amplifier for each direction of transmission and being provided with automatically operating means for blocking one amplifier in response to speech currents propagated by the other amplifier and vice versa.

It will now be assumed that there is a strong background noise at station S3. The current produced by the noise will of course be propagated through amplifier II together with the speech current enough to cause the amplifier I to remain blocked after the subscriber at station S3 has stopped talking. In such case the speech current emanating from station S1 will not reach station S3 or will be damped to such extent that the sound produced by transducer H3 in response to such current will be inaudible.

When the subscriber at station S1 realizes that his speech does not reach the subscriber at station S3 because amplifier I is blocked due to background noise at the latter station, he can alter this state of things by operating the shifting key TK1. When shifting key TK1 is operated, the above mentioned energizing circuit of relays TR1 and TR2 will be completed. The coil of relay TR2 is connected directly to the energizing circuit, but the coil of relay TR1 is connected to this circuit over a break contact member 1 of a change-over contact of its own. Therefore as soon as relay TR1 has been energized, its coil will be disconnected from the said energizing circuit and instead connected to a holding circuit including the make contact member 2 of said change-over contact (which is preferably of the make-before-break type), and contact 7 of relay AR1. If shifting key TK1 has once been operated, relay TR1 will thus remain in energized condition even though shifting key TK1 is released again, whereas relay TR2 will remain in energized condition only as long as shifting key TK1 is maintained in operated condition.

It will be seen that when relay TR1 is in energized condition, amplifier II is entirely ineffective, since the connections to its input side are broken at contacts 5 and 8 of relay TR1. Amplifier I will then be used for both directions of transmission, and reversal of the direction of transmission will be effected by shifting the connections to the input and output sides of amplifier I. This shifting is brought about by means of relay TR2 under the control of shifting key TK1 as will now be described in detail.

Assuming that shifting key TK1 is kept operated so that not only relay TR1 but also relay TR2 is in energized condition, transducer M1 at station S1 will be connected to the input side of amplifier I over contacts 4 and 5 of relay AR1, contacts 1 and 3 of relay TR2 and contacts 7 and 4 of relay TR1. The output side of amplifier I is connected to transducer M3 at station S3 over contacts 3 and 6 of relay TR1, contacts 7 and 5 of relay TR2 and contacts 4 and 3 of relay BR3. Thus the direction of transmission is now from station S1 to station S3, transducer M1 serving as microphone and transducer M3 as loudspeaker. It will be obvious that in this case any background noise at station S3 cannot affect amplifier I.

When the subscriber at S1 has stopped talking and wants to give the subscriber at S3 a chance of replying, he releases shifting key TK1. Relay TR2 is then de-energized while relay TR1 remains in energized condition. Transducer M3 is now connected to the input side of amplifier I over contacts 3 and 4 of relay BR3, contacts 6 and 8 of relay TR2 and contacts 4 and 7 of relay TR1. The output side of amplifier I is connected to transducer M1 at station S1 over contacts 3 and 6 of relay TR1, contacts 2 and 4 of relay TR2 and contacts 4 and 5 of relay AR1. The direction of transmission is thus from station S3 to station S1, transducer M3 serving as microphone and transducer M1 as loudspeaker.

When relay TR1 is in energized condition, the transducers H1 and H3 will be ineffective, because transducer H1 is connected to the output side of amplifier II which is ineffective as stated above, and transducer H3 is disconnected from the amplifier I at contacts 9 and 10 of relay TR1.

When the conversation is finished, the subscriber at station S1 restores the switch K13. The energizing circuit for relays AR1 and BR3 is then broken so that these relays are released. The holding circuit for relay TR1 is broken at contact 7 of relay AR1, and thus relay TR1 is also released. The current feed circuit for the signalling lamps L is broken at contact 3 of relay AR1. The system has now been restored to rest condition.

In the above description of the operation it was assumed that strong background noise is present at station S3, i. e. at the called station: If background noise is present at S1, i. e. at the calling station, amplifier II may remain blocked after the subscriber at station S1 has stopped talking, so that when the subscriber at station S3 begins talking, the speech current from S3 cannot reach S1. In that case also the subscriber at station S1 operates the shifting key TK1, and the operation will then be the same as that described above.

The system according to Figure 1 may of course include any desired number of subscriber's stations although, for the sake of clearness, only three stations have been shown in the figure. The system may also include a plurality of connecting circuits so that a plurality of connections may be operative at the same time. In the latter case it will be necessary to provide selecting means operative in response to the initiation of a call to select a free connecting circuit, and other modifications obvious to those skilled in the art will also be necessary in the telephone sets. However the present invention is applicable even to systems modified in this way. When a plurality of connecting circuits, each having two amplifiers, are provided, one relay corresponding to TR1 and one relay corresponding to relay TR2 should be associated with each such circuit.

Figure 2 illustrates very schematically a modified intercommunication system embodying the invention. In the figure A and B indicate a calling and a called telephone set respectively each having a microphone M and a loudspeaker H. According to the invention a shifting key (speech button) TK is further provided in telephone set A. In the illustrated embodiment the telephone sets are connected to a switching device through which they can be selectively connected to either of two or more connecting circuits comprising a two-way amplifier F with the amplifying channels I and II. Only one such connecting circuit is shown. Telephone set A is connected to the connecting circuit over contacts on a relay AR and telephone set B is connected to the same connecting circuit over contacts on a relay BR. It is assumed that each telephone set having calling facilities is provided with an AR relay for each connecting circuit and that all the telephone sets are in addition provided with a BR relay for each connecting circuit. The AR relays are operated e. g. by the call proper and besides by a call distributing device or the like so that connection is effected to a free connecting circuit, and the corresponding BR relay of the called set is operated by a calling key individual to the set and furthermore in dependence of the said call distributing device or the operation of the AR relay so that the called set is connected to the seized connecting circuit. Thus at least telephone set A includes in addition to the shown arrangements also calling keys having direct connections to the different telephone sets and preferably a reset key for restoring the switching device when the conversation is finished, signalling lamps and other devices. The manner in which a connection is established is not essential to the invention, but the connection can be established in any arbitrary manner.

However the system illustrated by Figure 2 may also be of the same design as that shown in Figure 1 except as regards the modified features to be described in the following, and the elements not shown in Figure 2 may be equal to the corresponding elements in the system shown in Figure 1.

In the system according to Figure 2 there are also included two relays TR1 and TR2 the function of which is to effect the abovementioned elimination of the automatic shifting of the amplifiers which is the object of the invention. These relays are preferably included as shown in the connecting circuit equipment although this is of course not necessary. For this reason these relays are connected to the shifting key TK of the respective calling telephone set A over a contact in the respective switching means for connection to the connecting circuit, i. e. contact 5–AR. Relays TR1 and TR2 have a common energizing circuit extending over the make contact in the shifting key TK. For relay TR1 and individual part of the energizing circuit passes over its own break contact 2–TR1 included in a change-over contact device the make contact 3–TR1 of which is inserted in a holding circuit which is assumed to be broken at the end of the conversation e. g. by the said reset key being operated. The holding circuit may for instance pass over a make contact on the AR relays. The function of the other relay contacts shown in the figure will appear from the subsequent description of the operation of the arrangement.

Assuming now that the subscriber at A depresses the call button of telephone set B, relay AR is energized in known manner so that microphone M and loudspeaker H in telephone set A are connected to a free connecting circuit over contacts 1—4 on relay AR. The called telephone set B is connected to the same connecting circuit by relay BR which effects by means of its contacts 1—4 connection of the loudspeaker H and microphone M of this set. As mentioned above amplifier F is a two-way amplifier having an amplifier unit I for the transmission direction A—B and another amplifier unit II for the transmission direction B—A.

When relay AR is operated an energizing circuit for relays TR1 and TR2 is prepared at contact 5–AR which circuit is completed when shifting key TK is operated. However this does not normally occur since the amplifier units I and II are adapted to be controlled in known manner by the transmitted speech currents and block each other so that transmission can only occur in one direction at a time. However, if the subscriber at A notices that the automatic shifting is not effective due to a strong background noise, he operates his shifting key TK. Then relays TR1 and TR2 are energized, the former by current over shifting key TK, contact 5–AR and contact 2–TR1, and the latter by current over shifting key TK and contact 5–AR. Relay TR1 holds itself energized over contact 3–TR1, and the holding circuit is assumed to be controlled by the reset key (not shown) on telephone set A by means of which the connection is released at the end of the conversation. At contact 1–TR1 a circuit is prepared for short circuiting the input of amplifier unit I, but this short-circuiting path is immediately broken at contact 1–TR2. Instead the input of amplifier unit II is short-circuited by contact 2–TR2. As long as the subscriber at telephone set A keeps his shifting key TK depressed, the amplifier unit II is thus blocked, and since the blocking is effected at the input side of the amplifier, no regulating voltages will appear which may block amplifier unit I. When shifting key TK is operated, the transmission occurs of necessity in the direction A—B and only in this direction. When the subscriber at telephone set A wants to be answered by the subscriber at telephone set B, he releases his shifting key TK whereby relay TR2 is released while relay TR1 remains energized by current over its holding circuit. The short circuit of amplifier II is then broken at contact 2–TR2, while instead the input of amplifier unit I is short-circuited at contact 1–TR2. Then the direction of transmission will now be from B to A.

Blocking of the two amplifier units by means of the shifting key TK may of course be effected in other ways, e. g. in such manner that the inputs of the amplifier units are disconnected or resistors which may be variable are inserted therein.

How blocking can be effected by interrupting the input circuits of the amplifier units is illustrated in Figure 3. Contacts 1*a* and 1*b* on relay TR1 and contacts 1*a*, 1*b*, 2*a* and 2*b* on relay TR2 bring about this interruption.

The mode of operation of this arrangement is basically analogous to that of the arrangement according to Figure 2, and therefore a detailed description will not be necessary. The resistors designated *r* are intended to indicate how resistors can be connected so as to be switched into the input circuits of the respective amplifier units on the shifting. Such resistors may be desirable to eliminate or reduce disturbing clicks on the shifting. Furthermore, such resistors may also be included in the short-circuiting paths in the arrangement shown in Figure 1. Of course it is also possible to bring about simultaneously blocking of the inputs of the amplifier units in a fully analogous or any arbitrary manner.

In the embodiments described above the elimination of the automatic blocking of the amplifiers and the shifting of the direction of transmission is solely controlled by the calling subscriber by means of shifting key TK at the calling station. Shifting key TK at the called station is ineffective, because relay AR at the called station is not energized.

However the control circuits of relay TR1 and TR2 can easily be modified thus that both the called and the calling party can control these relays and effect the various shifting operations. Thus for instance each of the relays BR in Figure 1 may be provided with an additional make contact connected in parallel with contact 6 of relay AR. Then the called subscriber will also be able to control relays TR1 and TR2 by operating his shifting key TK. It will be understood that in this case when a shifting key TK is maintained operated the direction of transmission will be from the calling station to the called station irrespective of whether the operated shifting key is located at the calling or at the called station, and when no shifting key TK is in operated condition, the direction of transmission will be from the called to the calling station (provided that a shifting key has previously been operated at least once). Therefore if only the called subscriber is manipulating his shifting key during the conversation, he must keep the shifting key operated when listening and release it when he wants to talk, whereas if only the calling subscriber is manipulating his shifting key, the latter subscriber will have to keep the shifting key operated while talking and release it when listening.

The embodiments described above are given by way of example only, and can be varied and modified in many other ways without departing from the scope of the invention.

I claim:

1. An intercommunication system comprising a plurality of subscribers stations, a connecting circuit including an amplifier for each direction of transmission, said amplifiers having automatically operating means for reducing the gain of one amplifier and vice versa, switching means for interconnecting the connecting circuit between any two subscribers stations so as to establish a two-way communication path between two selected stations, the connecting circuit further including a first and a second relay means, the energizing circuits of said first and second relay means being connectable by said switching means to manually operable control means in the selected stations, the first relay means being arranged to remain in energized condition when once energized by the operation of said manually operable control means until the connection between the two selected stations is released, the second relay means being adapted to remain in energized condition only as long as the manually operable control means is in operated position, the first and second relay means having contacts which are associated with the connecting circuit in such manner that, when said first relay means has once been energized, the direction of transmission in the connecting circuit is determined by the condition of the second relay means.

2. An intercommunication system comprising a plurality of subscribers stations, a connecting circuit including an amplifier for each direction of transmission, said amplifiers having automatically operating means for reducing the gain of one amplifier in response to audio frequency currents through the other amplifier and vice versa, switching means for causing the connecting circuit to be interconnected between any two subscribers stations so as to establish a two-way connection between the two stations, the connecting circuit further having a first and a second relay means associated therewith, the energizing circuits of said first and second relay means being connectable over said switching means to a manually operable control means in the subscribers stations, the first relay means remaining in energized condition when once energized by the operation of said manually operable control means until the connection between the two stations is released, the second relay means remaining in energized condition only as long as the manually operable control means is in operated condition, contacts on the first and second relay means being incorporated in the connecting circuit in such manner that when the first relay means is in energized condition one of said amplifiers is ineffective and the other amplifier is connected to contacts on the second relay means in such manner that the energization of the second relay means causes reversal of the connections to the input and the output of the other amplifier.

3. An intercommunication system comprising a plurality of subscribers stations, each station having a first transducer capable of operating both as a microphone and as a loudspeaker and a second transducer being capable of operating at least as a loudspeaker, a connecting circuit including one amplifier for each direction of transmission, said amplifiers having automatically operating means for reducing the gain of one amplifier in response to audio frequency currents through the other amplifier and vice versa, switching means for interconnecting the connecting circuit between any two selected subscribers stations so as to establish a communication path between the two selected stations, a first and a second relay means being arranged to remain in energized condition when once energized by the operation of said manually operable control means until the connection between the two stations is released, the second relay means being arranged to remain in energized condition only as long as the manually operable control means is kept in operated condition, contacts on the first and second relay means being connected in series with the amplifiers in the connecting circuit in such manner that when both the first and the second relay means are in non-energized condition there is a connection from the first transducer in the calling station over one of the amplifiers to the second transducer in the called station and a connection from the first transducer in the called station over the other amplifier to the second transducer in the calling station and when the first relay means is in energized condition one of the amplifiers is disconnected and the input and output connections of the other amplifier are connected to contacts on the second relay means, said contacts on the second relay means being change-over contacts arranged to keep the said other amplifier connected between the first transducer in the calling station and the first transducer in the called station and to reverse the input and output connections to the amplifier when the second relay means is operated, thereby causing reversal of the direction of transmission.

4. An intercommnication system as claimed in claim 3 in which said switching means are arranged when operated to connect the energizing circuits of said first and second relay means to a manually operable control means located in the calling station.

5. An intercommunication system comprising a plurality of subscribers stations, a connecting circuit including an amplifier for each direction of transmission, said amplifiers having automatically operating means for reducing the gain of one amplifier in response to audio frequency currents through the other amplifier and vice versa, switching means for interconnecting the connecting circuit between any two subscribers stations so as to establish a two-way communication path between the two stations, a first and a second relay means associated with the connecting circuit, energizing circuits of said first and second relay means being connectable by said switching means to manually operable control means in the subscribers stations, the first relay means being arranged to remain in energized condition, when once energized by the operation of said manually operable control means, until the connection between the two stations is released, the second relay means being arranged to remain in energized condition only as long as said manually operable control means is in operated condition, contacts on said first and second relay means being incorporated in the connecting circuit in such manner that when the first relay is in energized condition one of the amplifiers in the connecting circuit is kept ineffective, and when both the first and the second relay means are in energized condition the other amplifier is kept ineffective.

6. An intercommunication system as claimed in claim 5 in which the first relay means has a make contact and the second relay means has a break contact, said make contact and break contact being connected in series across the input side of one amplifier, and the second relay means has a make contact connected across the input side of the other amplifier, whereby the input of one amplifier will be shortcircuited when the first relay means is in energized and the second relay means in non-energized condition, whereas the input side of the other amplifier will be shortcircuited when both the first and the second relay means are in energized condition.

7. An intercommunication system as claimed in claim 5 in which the first relay means has a break contact and the second relay means has a make contact connected in parallel with the said break contact, the parallel combination of said contacts being connected in series with an input connection to one amplifier, and the second relay means has a break contact connected in series with an input connection to the other amplifier, whereby the connection to one amplifier will be broken when the first relay means is in energized and the second relay means in non-energized condition, whereas the input connection to the other amplifier will be broken when both the first and the second relay means are in operated condition.

8. An intercommunication system as claimed in claim 7 in which resistors are connected in parallel with said contacts.

References Cited in the file of this patent

UNITED STATES PATENTS 2,352,711 Hasenberg ---------------- July 4, 1944
2,427,496 Feldscher ---------------- Sept. 16, 1947